Jan. 26, 1954
C. C. STUART
2,667,377
MOTORCAR CARRIER, FIVE-CAR CAPACITY
Filed Aug. 14, 1951
5 Sheets-Sheet 1
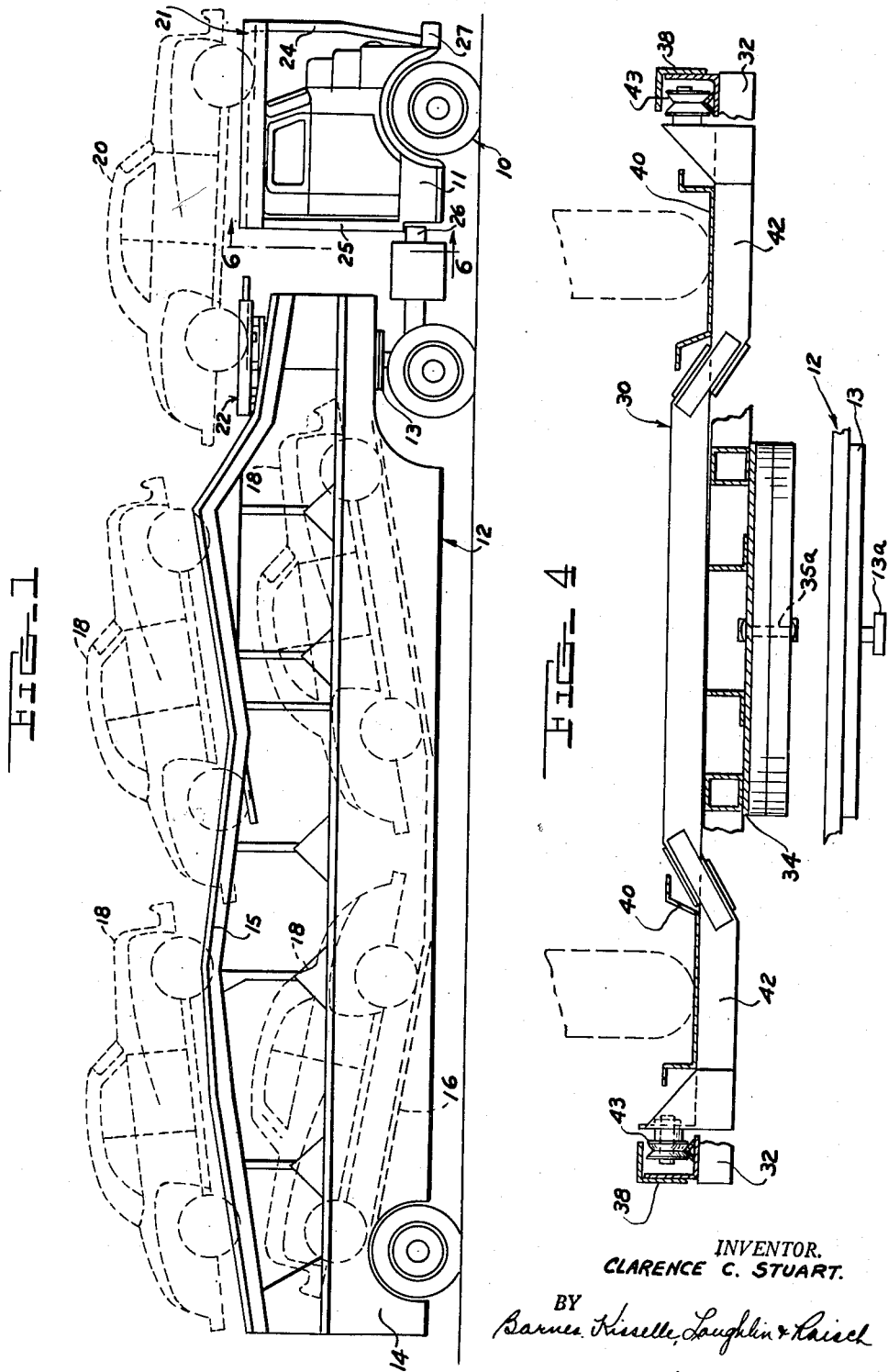
INVENTOR.
CLARENCE C. STUART.
BY
Barnes, Kisselle, Laughlin & Raisch
ATTORNEYS.

Jan. 26, 1954  C. C. STUART  2,667,377
MOTORCAR CARRIER, FIVE-CAR CAPACITY
Filed Aug. 14, 1951  5 Sheets-Sheet 2
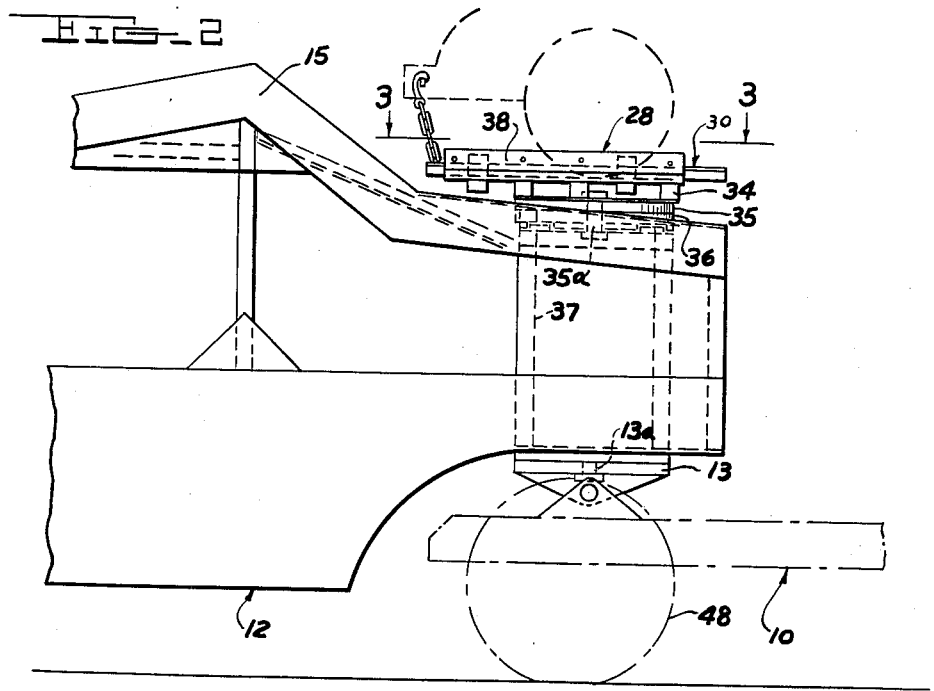
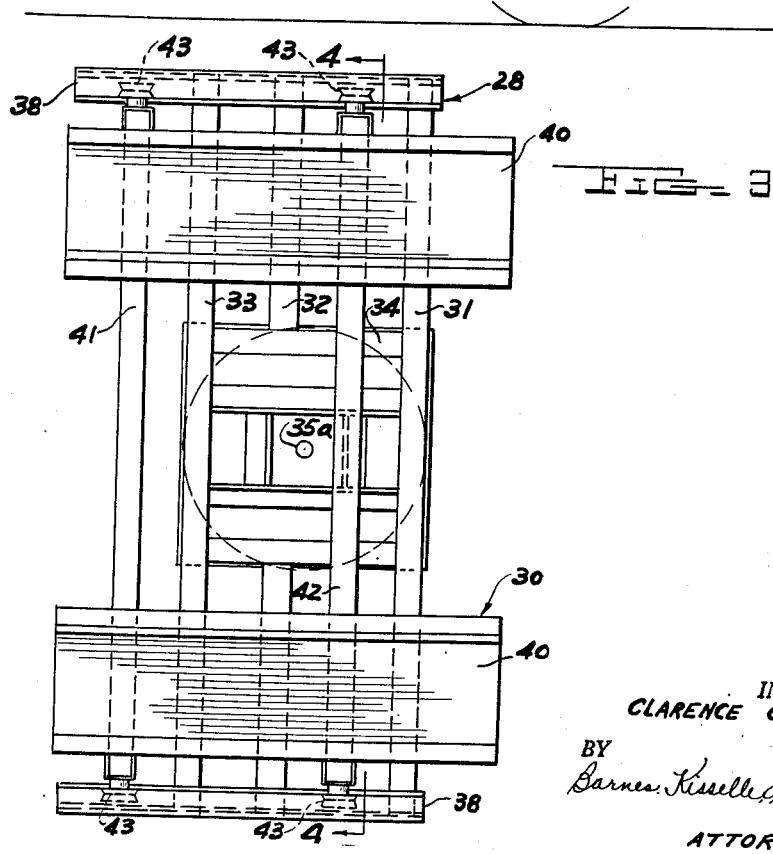
INVENTOR.
CLARENCE C. STUART.
BY
Barnes, Kisselle, Laughlin &
Raisch
ATTORNEYS Jan. 26, 1954
C. C. STUART
2,667,377
MOTORCAR CARRIER, FIVE-CAR CAPACITY
Filed Aug. 14, 1951
5 Sheets-Sheet 3
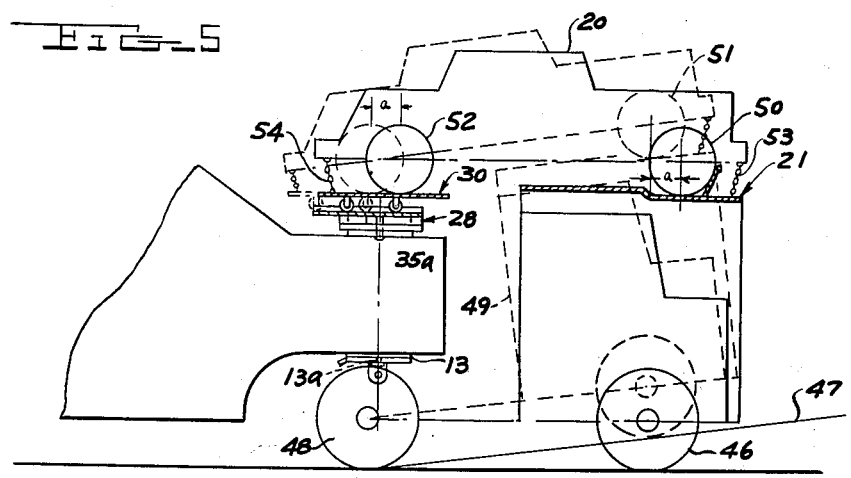
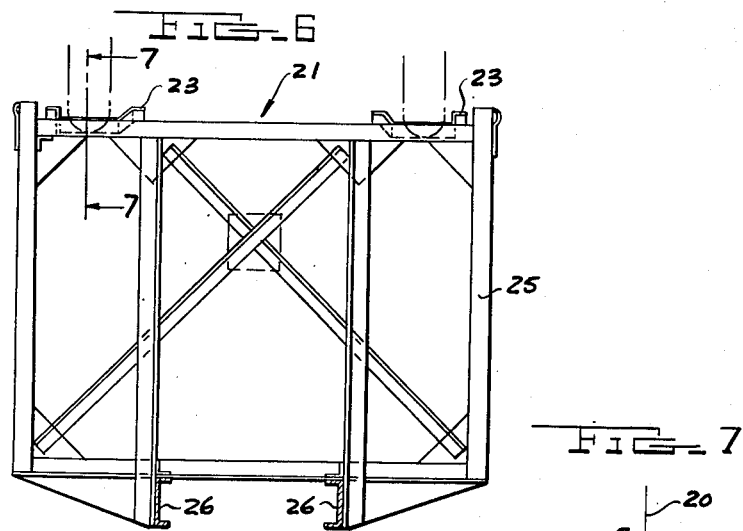
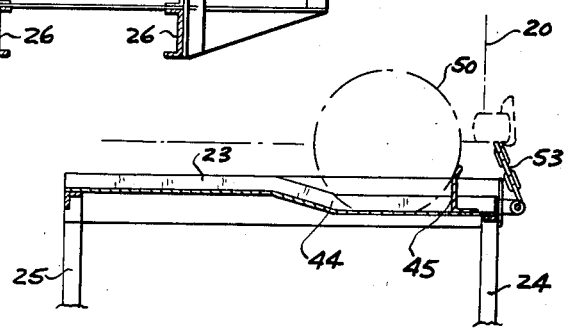
INVENTOR.
CLARENCE C. STUART.
BY
Barnes, Kisselle, Laughlin & Raisch
ATTORNEYS.

Jan. 26, 1954   C. C. STUART   2,667,377
MOTORCAR CARRIER, FIVE-CAR CAPACITY
Filed Aug. 14, 1951   5 Sheets-Sheet 4
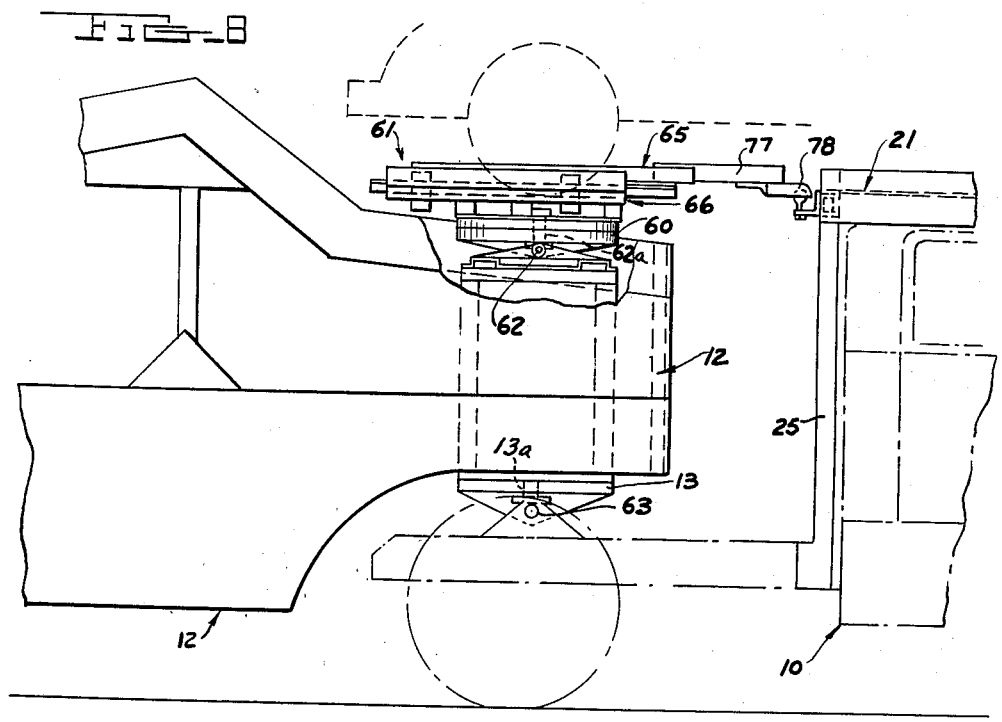
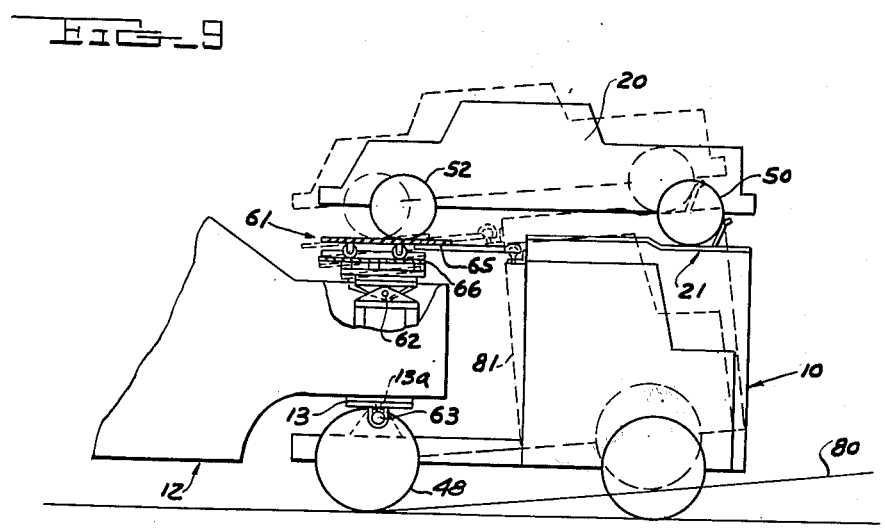
INVENTOR.
CLARENCE C. STUART.
BY
Barnes, Kisselle, Laughlin + Raisch
ATTORNEYS.

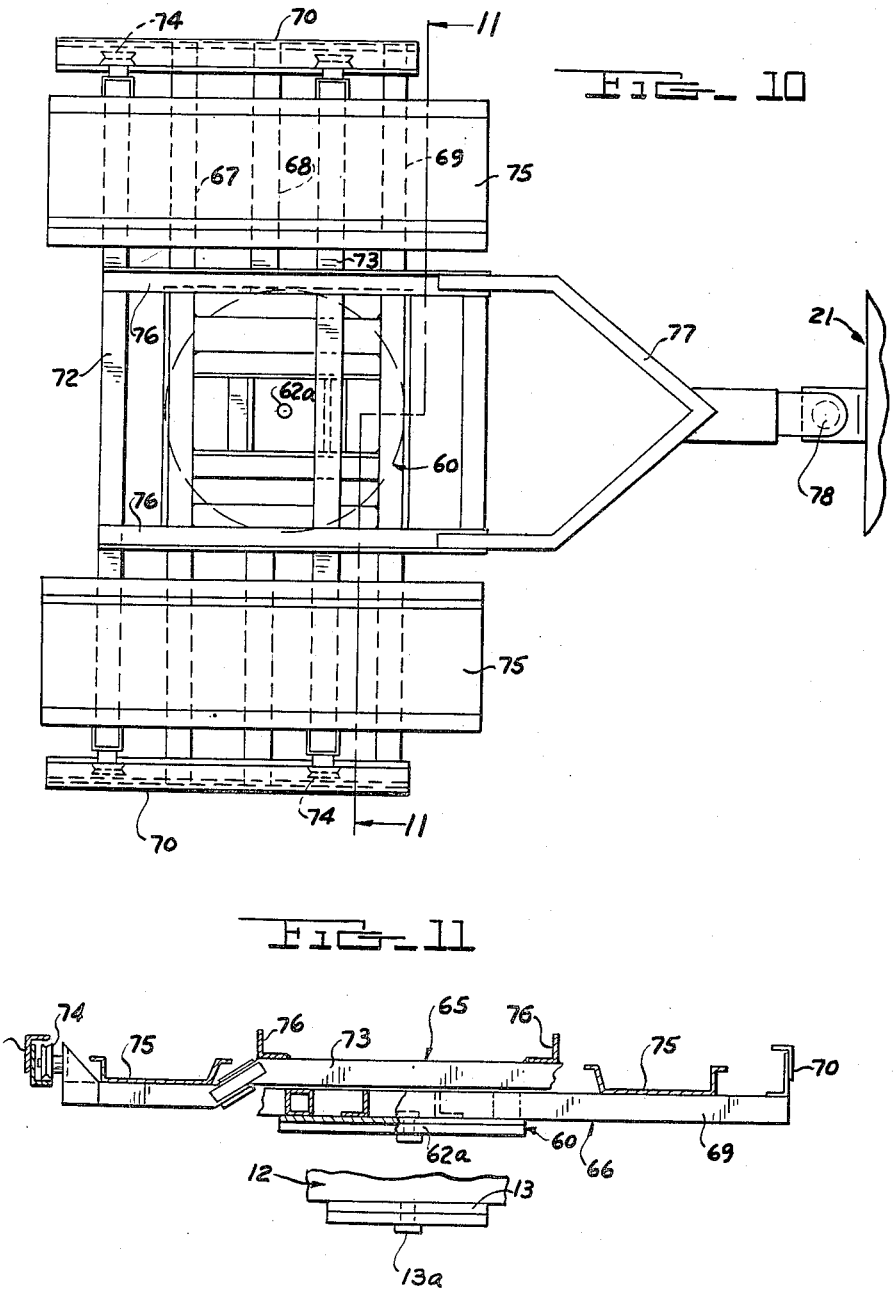

Patented Jan. 26, 1954

2,667,377

UNITED STATES PATENT OFFICE 2,667,377

MOTORCAR CARRIER, FIVE-CAR CAPACITY

Clarence C. Stuart, Dearborn, Mich., assignor to Traffic Transport Engineering, Inc., Dearborn, Mich., a corporation of Michigan Application August 14, 1951, Serial No. 241,787

21 Claims. (Cl. 296—1)

This invention relates to a motor car carrier.

A conventional motor car carrier usually includes a tractor provided with a cab and a trailer having a fifth wheel connection with the tractor. The trailer usually includes an upper deck and a lower deck each in the form of a track section on which the motor cars are supported. The maximum size of tractor-trailer units is controlled by local laws, and a standard tractor-trailer unit having an overall length of about 45 feet is designed to carry a total of four motor cars on the upper and lower decks of the trailer.

The present invention has for its object the provision of a tractor-trailer unit of standard length which is adapted to haul five cars instead of four. In other words, without increasing the overall length, the pay load of the motor car carrier of this invention is increased by one car over the standard motor car carrier.

More specifically the invention contemplates a tractor-trailer arrangement on which a fifth car is adapted to be supported with its front wheels supported above the cab of the tractor and its rear wheels supported by the upper front end of the trailer. The arrangement includes a stationary platform supported over the cab of the tractor and a short track section mounted at the upper front end of the trailer. The short track section is mounted on a fifth wheel to enable the track section to turn with the tractor and is movable fore and aft of the trailer to prevent the wheels of the motor car supported by the track section from "walking" as the tractor raises or lowers when traveling over uneven ground.

In the drawings:

Fig. 1 is a side elevation of a tractor-trailer unit of this invention showing in broken lines the arrangement of five cars thereon.

Fig. 2 is a fragmentary side elevation of the front end of the trailer unit of the motor car carrier.

Fig. 3 is a top plan view of the movable track section on the trailer as viewed generally along the lines 3—3 in Fig. 2.

Fig. 4 is a sectional view taken along the lines 4—4 in Fig. 3.

Fig. 5 is a somewhat diagrammatic view of the tractor and trailer illustrating the action that occurs when the tractor travels up an incline.

Fig. 6 is a sectional view along the lines 6—6 in Fig. 1 and showing the supporting frame for the platform above the cab of the tractor.

Fig. 7 is a sectional view along the lines 7—7 in Fig. 6.

Fig. 8 is a fragmentary side elevation of a vehicle trailer provided with a modified form of movable track section.

Fig. 9 is a diagrammatic view similar to Fig. 5 and illustrating the action that takes place with the modified track construction as the tractor goes up an incline.

Fig. 10 is a top plan view of the track section of modified construction.

Fig. 11 is a sectional view taken substantially along the lines 11—11 in Fig. 10.

Referring to the drawings and particularly to Fig. 1, there is illustrated a tractor 10 provided with a cab 11 and having hitched thereto a motor car carrier trailer 12. Trailer 12 is connected with tractor 10 by a conventional fifth wheel assembly 13, e. g. as shown in U. S. patent to Reid 1,925,279. Trailer 12 includes a generally open framework 14 which supports an upper track section 15 and a lower track section 16 which provide upper and lower decks for supporting the four motor cars 18 as illustrated in Fig. 1.

The tractor-trailer unit illustrated is adapted to carry a fifth car 20 by supporting the front wheels of the car on a platform 21 on the tractor and by supporting the rear wheels of the car on a track assembly 22 on the trailer 12. Platform 21 comprises a pair of spaced apart track sections 23 disposed horizontally above cab 11. At their front ends tracks 23 are supported in spaced relation by a frame 24, and at their rear ends the track sections 23 are supported by a frame 25 which is in turn supported on the frame members 26 of tractor 10. It will be observed that platform 21 extends forwardly from a point just rearwardly of cab 11 to a point generally vertically aligned with a front bumper 27 of tractor 10. In other words, platform 21 does not substantially increase the size of tractor 10 or the clearance necessary for accommodating the tractor.

Referring now more particularly to Figs. 2 and 3, it will be seen that the track assembly 22 includes a lower track section 28 and an upper track section 30. Lower track section 28 includes a plurality of transverse struts 31, 32 and 33 which are welded to a generally rectangular frame 34 which is in turn attached to the upper fifth wheel 35 of an upper fifth wheel assembly, the lower fifth wheel 36 of which is rigidly mounted on a supporting frame 37 at the front end of the framework 14 of trailer 12. The upper fifth wheel 35 is rotatably mounted on lower fifth wheel 36 by bolt 35a. Fifth wheel assembly 35, 36 is arranged on trailer 12 such that the vertical pivotal axis of the fifth wheel assembly (bolt 35a) generally coincides, i. e., is vertically aligned, with the vertical pivotal axis of lower fifth wheel assembly 13 between tractor 10 and trailer 12, that is, king pin 13a. At each end transverse strut members 31, 32 and 33 have attached thereto guide tracks 38 on which the upper track section 30 is supported for rolling movement fore and aft of the trailer.

Upper track section 30 includes a pair of spaced apart, longitudinally extending channel-shaped tracks 40 extending parallel and supported in spaced relation by transverse strut members 41 and 42. At each end struts 41 and 42 are provided with rollers 43 which are guided for rolling movement in guide tracks 38. With the above construction it will be observed that the upper track section 30 is movable forwardly from the position shown in Fig. 3 to a position wherein strut 41 abuts against the rear face of strut 33 and is movable rearwardly from the position shown in Fig. 3 to a position wherein strut 42 abuts against the front face of strut 32. Tracks 40 are positioned generally in horizontal alignment with tracks 23, the latter having a dip 44 adjacent the front end thereof and being provided with a stop 45 for limiting the extent to which the vehicle 20 can be driven forwardly on platform 21.

Referring now to Fig. 5 wherein the operation of the track assembly 22 is illustrated, it will be observed that, as the front wheels 46 of the tractor 10 ride up an incline such as at 47, the tractor pivots about the axis of its rear wheels 48 to the position shown generally by broken lines 49. Platform 21 pivots upwardly and rearwardly and the front wheels 50 of vehicle 20 are pivoted from the position shown in full lines to the position shown in broken lines 51. It will be observed that the front wheels 50 are shifted upwardly and rearwardly about the axis of wheels 48 as a center. Since the rear wheels 52 of vehicle 20 are supported upon trailer 12, it is obvious that the movable track section 30 supporting these rear wheels will have to be shifted rearwardly a distance corresponding to the rearward displacement of wheels 50 in order to prevent the wheels of vehicle 20 from "walking" on their respective track sections. Vehicle 20 is connected at its front end with platform 21 by a chain 53 and at its rear end with movable track section 30 by a chain 54. It will be observed that for the incline 47 illustrated, front wheels 50 of vehicle 20 are displaced rearwardly a distance $a$. Consequently, track section 30 rolls rearwardly on support 28 a corresponding distance $a$.

It will be appreciated, of course, that since the vertical pivotal axis 35a of fifth wheel 35, 36 is concentric with the vertical pivotal axis 13a of fifth wheel 13, vehicle 20 turns about the same vertical axis about which tractor 10 turns.

Vehicle 20 is loaded on the unit by driving the vehicle along the upper track 15 of trailer 12. Short jumper tracks (not illustrated) are utilized for temporarily connecting track 15 with movable track section 30 and movable track section 30 with platform 21. After the vehicle is loaded in the position shown in Fig. 1, these jumper tracks are removed.

In the arrangement illustrated in Figs. 1 through 7 it will be observed that, when the vehicle 20 is being loaded, some sort of means must be provided for preventing the upper track section 30 from sliding on support 28. These means may be in the nature of a latch arrangement on track section 30 or the jumper tracks previously referred to may be employed for locking track section 30 in place while the vehicle is being loaded. Unless track section 30 is prevented from sliding during loading, it is obvious that this track section will have a tendency to kick back or ahead when the vehicle is being loaded. For instance, as the front wheels of the vehicle 20 come to a stop and push up against stop 45, track section 30 will have a tendency to slide rearwardly on support 28.

The arrangement illustrated in Figs. 8 through 11 is designed to eliminate unwanted movement of the movable track section on the trailer 12. In this arrangement the fifth wheel 60 on which the track assembly 61 is supported is pivotally mounted on trailer 12 for pivotal movement fore and aft as by the pivotal connection 62. The pivotal axis 62 is aligned vertically with the horizontal pivotal axis 63 of fifth wheel 13, and the vertical axes 62a and 13a of these two fifth wheels are also vertically aligned.

Track assembly 61 includes an upper movable section 65 and a lower section 66 which is secured to the fifth wheel assembly 60. Lower section 66 includes spaced transversely extending struts 67, 68 and 69 which are supported upon the upper portion of the fifth wheel assembly 60. At their opposite ends, struts 67, 68 and 69 support guide tracks 70. The upper track section 65 includes spaced transversely extending struts 72 and 73 which carry rollers 74 at their opposite ends, the rollers being guided for movement forwardly and rearwardly in guide tracks 70. A pair of spaced apart, channel-shaped tracks 75 are supported on struts 72 and 73. Upper track section 65 also includes a pair of spaced apart, longitudinally extending rails 76 which are fixedly secured to the upper faces of strut members 72. At their forward ends rails 76 have rigidly connected therewith a drawbar 77 in the form of an A frame having a ball and socket joint connection 78 with the rear portion of platform 21. With this arrangement it will be observed that the movable track section 65 is at all times connected with the platform 21.

Referring now to Fig. 9, it will be observed that, when the tractor 12 travels up an incline 80, the tractor will tend to pivot upwardly about its rear wheels 48 to the position shown in dotted lines 81, platform 21 and the front wheels of vehicle 20 also pivoting from the positions shown in solid lines to those shown in broken lines. Since the track assembly 61 is more or less rigidly connected with platform 21 by drawbar 77, it is obvious that this track assembly together with the fifth wheel assembly 60 will pivot rearwardly about the axis 62. However, since the radius about which the front wheels 50 of vehicle 20 pivot is substantially greater than the radius about which the rear wheels 52 of vehicle 20 pivot, it is obvious that track section 65 will slide rearwardly on track section 66 when the tractor travels up an incline such as is illustrated in Fig. 9. Thus, movable track section 65 shifts from the position shown in solid lines in Fig. 9 to that shown in broken lines.

It will thus be seen that the tractor-trailer arrangement of this invention possesses some very distinct advantages. In the first place, it enables the pay load of a tractor-trailer unit of generally standard dimensions to be increased by one motor car. Furthermore, it will be noted that, although the construction herein described requires the erection of a platform over the cab of the tractor, the provision of this platform does not prevent use of the tractor with any standard trailer. It does not make the tractor a special piece of equipment usable only with the particular trailer illustrated in the drawings as would be the case if the platform 21 were extended rearwardly on tractor 10 such as to support both the rear and the front wheels of the vehicle 20, in which case the tractor would be usable only with the trailer having a front portion cut away to provide clearance for swinging movement of the rear end of the extended platform.

I claim:

1. In combination, a tractor and a trailer attached thereto for hauling vehicles, said tractor having a platform thereon for supporting one end of the vehicle being hauled, said trailer having at the front end thereof a track section for supporting the other end of the vehicle being hauled, said track section being pivotally supported on said trailer, said track section being longitudinally shiftable on said trailer, said trailer being connected with the tractor by means of a fifth wheel, said track section being pivotable on said trailer on a vertical axis coinciding with the vertical axis of pivoting of said fifth wheel, and including a fifth wheel between said track section and said trailer and supporting said track section on said trailer.

2. In combination, a tractor and a trailer for hauling vehicles, a pivotal connection between said tractor and trailer, said tractor having a platform thereon for supporting the front wheels of a vehicle being hauled, said platform being spaced above and forwardly of the pivotal connection between the tractor and trailer, said trailer having at the front end thereof and positioned above the pivotal connection between the tractor and trailer a short track section for supporting the rear wheels of a vehicle being hauled, a supporting member positioned between said short track section and the front end of said trailer for supporting said short track section on said trailer, said short track section being shiftable on said supporting member in a direction generally fore and aft of the trailer, means forming a pivotal connection between said supporting member and said trailer for permitting pivotal movement of the supporting member in a generally horizontal plane relative to said trailer, said last mentioned means being vertically aligned with the pivotal connection between the tractor and the trailer.

3. The combination set forth in claim 2 wherein the pivotal connection between the tractor and the trailer and the pivotal connection between the trailer and said supporting member comprise fifth wheels.

4. The combination set forth in claim 1 wherein said track section includes a portion fixedly supported by said last mentioned fifth wheel and a second portion supported by and slidable forwardly and rearwardly of said first mentioned portion of said track section.

5. The combination set forth in claim 4 wherein said fifth wheels are arranged such that their vertical axes are substantially in vertical alignment.

6. In combination, a tractor provided with a cab and a trailer for hauling vehicles pivotally connected with said tractor, said tractor having a platform mounted thereon above the cab for supporting the front wheels of a vehicle, said trailer having a supporting member at the front end thereof supported for pivotal movement in a substantially horizontal plane, a track section mounted on said supporting member for movement fore and aft of the trailer, said track section being spaced from said platform such as to support the wheels at one end of a vehicle whose wheels at the other end are supported on said platform.

7. The combination set forth in claim 6 wherein said platform is substantially no greater in length than said cab, said platform being shorter in length than the wheel base of the vehicles adapted to be hauled by said tractor-trailer.

8. The combination set forth in claim 6 including a fifth wheel connecting said tractor and said trailer, said fifth wheel being positioned on said tractor rearwardly of said cab, said supporting member being positioned such that, when the trailer is connected to the tractor, the pivotal axis of said supporting member generally coincides with the vertical pivotal axis of the fifth wheel whereby the vehicle being hauled is generally aligned with the tractor.

9. The combination set forth in claim 8 wherein said platform extends over said cab and terminates at its rear end substantially forwardly of the fifth wheel on said tractor whereby the rear end of said platform is spaced forwardly of the front end of said trailer.

10. In combination, a tractor and a trailer for hauling vehicles, a pivotal connection between said tractor and trailer, said tractor having a platform thereon for supporting the front wheels of a vehicle being hauled, said platform being spaced forwardly of the pivotal connection between the tractor and trailer, said trailer having at the front end thereof and positioned directly above the pivotal connection between the tractor and trailer a short track section for supporting the rear wheels of the vehicle being hauled, said short track section being supported for movement fore and aft of the trailer and for pivotal movement on said trailer in a generally horizontal plane, and non-extensible link means connecting said short track section with said platform.

11. The combination set forth in claim 10 wherein said last mentioned means comprises a drawbar having a pivotal connection with said platform.

12. The combination set forth in claim 11 wherein said drawbar has a rigid connection with said short track section.

13. In combination, a tractor and a trailer attached thereto for hauling vehicles, said tractor having a platform thereon for supporting the front wheels of a vehicle being hauled, said trailer having at the front end thereof a short track section for supporting the rear wheels of the vehicle being hauled, said short track section being supported on said trailer for pivotal movement about a substantially vertical axis and for longitudinal movement generally fore and aft of said trailer, and means for holding said short track section in a longitudinally fixed position relative to said platform.

14. The combination set forth in claim 13 wherein said short track section is mounted on said trailer for pivotal movement about a substantially horizontal axis.

15. The combination set forth in claim 14 wherein said last mentioned means comprises a drawbar extending between and connecting said short track section and said platform.

16. The combination set forth in claim 15 wherein said drawbar has a fixed connection with the front end of said short track section and a pivotal connection with the rear end of said platform.

17. In combination, a tractor provided with a cab and a trailer for hauling vehicles pivotally connected with said tractor, said tractor having a platform mounted thereon above the cab for supporting the front wheels of a vehicle, said trailer having a fifth wheel assembly at the front end thereof, said fifth wheel assembly having one portion mounted on the trailer and a second portion supported for movement on the first portion about a substantially vertical axis, a track section mounted on said second portion of said fifth wheel assembly for movement longitudinally thereon, said track section being arranged to support the rear wheels of said vehicle when the front wheels are supported on said platform, and means extending between and connecting said movable track section and said platform.

18. The combination set forth in claim 17 wherein said fifth wheel assembly is mounted on said trailer for pivotal movement about a substantially horizontal axis.

19. The combination set forth in claim 17 including a second fifth wheel assembly connecting said tractor with said trailer, said first and second fifth wheel assemblies being aligned such that the vertical axis of pivoting of the first mentioned fifth wheel assembly substantially coincides with the vertical axis of pivoting of the second mentioned fifth wheel assembly.

20. A trailer for hauling vehicles and adapted to be connected to a tractor which is provided with a platform for supporting the wheels at one end of a vehicle being hauled, said trailer being provided at its front end with pivot means adapted for connection with the tractor, said trailer also having at its front end a second platform supported for pivotal movement in a substantially horizontal plane, an auxiliary platform mounted on said second platform for movement generally fore and aft of the trailer, said auxiliary platform being adapted to support the wheels at the opposite end of the vehicle being hauled whereby when said vehicle negotiates a turn, said second and auxiliary platforms pivot in a substantially horizontal plane so that the vehicle being hauled will be generally aligned with the tractor and when said tractor rises or falls with respect to the trailer, said auxiliary platform moves generally fore or aft of the trailer on said second platform.

21. A trailer as called for in claim 20 wherein the axis of pivoting of said second platform generally coincides with the vertical pivotal axis of said pivot means adapted for connection with the tractor.

CLARENCE C. STUART.

References Cited in the file of this patent
UNITED STATES PATENTS

| Number | Name | Date |
|---|---|---|
| 1,880,123 | Davis et al. | Sept. 27, 1932 |
| 2,043,507 | Culemeyer | June 9, 1936 |
| 2,194,322 | Peterman | Mar. 19, 1940 |
| 2,373,398 | Hoobler | Apr. 10, 1945 |